United States Patent
Oya et al.

(10) Patent No.: US 10,302,505 B2
(45) Date of Patent: May 28, 2019

(54) TEMPERATURE SENSOR

(71) Applicant: NGK Spark Plug Co., LTD., Nagoya (JP)

(72) Inventors: Toshiya Oya, Nagoya (JP); Seiji Oya, Niwa-gun (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 185 days.

(21) Appl. No.: 15/284,047

(22) Filed: Oct. 3, 2016

(65) Prior Publication Data
US 2017/0108385 A1    Apr. 20, 2017

(30) Foreign Application Priority Data

Oct. 16, 2015 (JP) ................................ 2015-204633

(51) Int. Cl.
*G01K 7/18* (2006.01)
*G01K 1/08* (2006.01)

(52) U.S. Cl.
CPC ................ *G01K 7/18* (2013.01); *G01K 1/08* (2013.01); *G01K 2205/04* (2013.01)

(58) Field of Classification Search
None
See application file for complete search history.

(56) References Cited

U.S. PATENT DOCUMENTS

| 8,133,432 B2* | 3/2012 | Hasegawa | H01B 1/02 148/430 |
| 8,702,305 B2* | 4/2014 | Yokoi | G01K 7/22 338/22 R |
| 8,840,302 B2* | 9/2014 | Ko | G01K 7/22 252/500 |

(Continued)

FOREIGN PATENT DOCUMENTS

| JP | 11-40403 A | 2/1999 |
| JP | 2003-261350 A | 9/2003 |

(Continued)

OTHER PUBLICATIONS

Acken ("Some Physical Properties of Platinum-rhodium Alloys." Bureau of Standards Journal of Research 12, No. 2 (1934): 249. doi:10.6028/jres.012.023.).*

(Continued)

*Primary Examiner* — Clayton E. LaBalle
*Assistant Examiner* — Leon W Rhodes, Jr.
(74) *Attorney, Agent, or Firm* — Leason Ellis LLP (57) ABSTRACT

A temperature sensor includes: a temperature sensing element including a temperature sensing portion, electrical characteristics of which vary depending on temperature, and an electrode wire for outputting an electric signal from the temperature sensing portion to the outside; and a sheath core wire (signal wire) electrically connected to the electrode wire. The electrode wire is made of a platinum-rhodium alloy. The platinum-rhodium alloy is composed of 0.1 to 1.5 mol % of Sr, 22 to 40 mol % of Rh, and a remainder (Continued)

composed of Pt and unavoidable impurities. The platinum-rhodium alloy has a second-phase mainly composed of Sr and Pt whose precipitated grains are dispersed in a matrix phase. An area ratio of the second phase at a cross section is not greater than 25%.

15 Claims, 4 Drawing Sheets

(56) References Cited

U.S. PATENT DOCUMENTS

2009/0323765 A1    12/2009    Yokoi et al.

FOREIGN PATENT DOCUMENTS

| JP | 2005-119959 A | 5/2005 |
| JP | 2010032493 A | 2/2010 |
| JP | 2010-60404 A | 3/2010 |
| JP | 2011033343 A | 2/2011 |

OTHER PUBLICATIONS

Japanese Office Action in corresponding JP Application No. 2015-204633, dated Feb. 19, 2019 (an English translation attached hereto).

* cited by examiner

TEMPERATURE SENSOR

This application claims the benefit of Japanese Patent Application No. 2015-204633, filed Oct. 16, 2015, which is incorporated herein in its entirety by reference.

FIELD OF THE INVENTION

The present invention relates temperature sensors.

BACKGROUND OF THE INVENTION

Conventionally, a temperature sensor has been known which includes: a temperature sensing element including a temperature sensing portion, the electrical characteristics of which vary depending on temperature, and an electrode wire electrically connected to the temperature sensing portion; and a signal wire joined to the electrode wire. In the temperature sensor having the above structure, a platinum-rhodium (PtRh) alloy is used as a material of the electrode wire of the temperature sensing element.

The platinum-rhodium alloy has been known as a material excellent in processability, weldability, heat resistance, and corrosion resistance. The platinum-rhodium alloy has higher strength as compared to pure platinum having similar advantages, from room temperature to a high temperature, and is less worn by an oxidized vapor of iridium as compared to platinum-iridium (PtIr) alloy. Therefore, the platinum-rhodium alloy has been used as a heat-resistant alloy, a material for chemical equipment, a conductive material, a material for ignition electrodes, a contact material, and the like in a wide range of fields.

For example, Japanese Patent Application Laid-Open (kokai) No. 2003-261350 discloses platinum alloys including the platinum-rhodium alloy, as materials for forming glass fiber production nozzle and bushing. Japanese Patent Application Laid-Open (kokai) No. 2005-119959 indicates that the platinum-rhodium alloy is suitable for a glass ceramic material production apparatus. As described in these documents, the platinum-rhodium alloy is used as a high-temperature material having high resistance to oxidation.

Meanwhile, Japanese Patent Application Laid-Open (kokai) No. H11-40403 discloses a binary platinum-rhodium alloy wire incorporated in a temperature sensor element having heat resistance of 1000° C., and indicates that the content of Rh is desirably 10 to 20% by weight. Japanese Patent Application Laid-Open (kokai) No. 2010-60404 indicates that a platinum alloy containing 5 to 15 mass % of Ir and/or Rh is suitable as a material of an electrode wire of a temperature sensor used at high temperatures. As described in these documents, the platinum-rhodium alloy is favorably used also as a conductive material required to have heat resistance and high-temperature strength.

PROBLEMS TO BE SOLVED BY THE INVENTION

A heat-resistant material is naturally required to have a high melting point, high strength, high resistance to corrosion, and the like, and is desired for its stability over a long term of use. The conventional platinum-rhodium alloy is often used as a binary alloy, but can be made a ternary or more solid solution alloy by appropriately selecting additive elements, thereby to achieve additional functions such as higher strength, higher melting point, higher resistance to corrosion, and the like. However, if the platinum-rhodium alloy is used at high temperatures for a long term, grain growth unavoidably occurs and crystal grains are coarsened, which may result in breakage at grain boundaries. For example, depending on the composition of the binary platinum-rhodium alloy (hereinafter referred to as "PtRh alloy" to be distinguished from the ternary platinum-rhodium alloy), the PtRh alloy may recrystallize at 600° C. or higher, and the crystal grains thereof may be coarsened such that the crystal grain diameter exceeds 100 μm if the PtRh alloy is held at a high temperature of 1000° C. or more for only a few hours.

Although the above platinum-rhodium alloy has high initial performance, probability of breakage increases due to, for example, sliding of grain boundaries with the passage of time, and therefore reliability of the platinum-rhodium alloy is insufficient for stable use over a long term. Therefore, in the case where the platinum-rhodium alloy is used as a material of the electrode wire of the temperature sensor having the above structure, strength of the electrode wire is reduced due to long-term use at high temperatures, which may result in deficiency such as breakage of the electrode wire.

The present invention provides a temperature sensor capable of improving the high-temperature strength of an electrode wire by using, as a material of the electrode wire, a platinum-rhodium alloy in which crystal grains are not coarsened even in long-term use at high temperatures.

SUMMARY OF THE INVENTION

Means for Solving the Problems

A temperature sensor according to an aspect of the present invention includes: a temperature sensing element including a temperature sensing portion, electrical characteristics of which vary depending on the temperature, and an electrode wire that outputs an electric signal from the temperature sensing portion to the outside; and a signal wire electrically connected to the electrode wire. The electrode wire is made of a platinum-rhodium alloy. The platinum-rhodium alloy comprises 0.1 to 1.5 mol % of Sr, 22 to 40 mol % of Rh, and a remainder composed of Pt and unavoidable impurities. In the platinum-rhodium alloy, second-phase composed essentially of Sr and Pt whose precipitated grains are dispersed in a matrix phase, and an area ratio of the second phase at a cross section is not greater than 25%.

According to the above temperature sensor, since the second-phase precipitated grains are present in the ternary platinum-rhodium alloy forming the electrode wire, movement of grain boundaries is restricted, and therefore coarsening of crystal grains can be suppressed even when the temperature sensor is used at high temperatures over a long term. In addition, the strength is improved due to the function of precipitation strengthening, and breaking elongation is advantageously large because of the fine grain diameter. Thus, the high-temperature strength of the electrode wire is improved, leading to improved durability and reliability. Further, even when the temperature sensor is used at high temperatures over a long term, occurrence of deficiency such as breakage of the electrode wires can be suppressed.

In the ternary platinum-rhodium alloy forming the electrode wire, almost all of Sr, which is an alkali earth metal, is present in the form of second phase precipitated grains, and almost all of the matrix phase portion is the binary PtRh alloy. Therefore, the electrical conductivity, the thermal conductivity, and the like of the electrode wire are equivalent to and are not degraded from those in the case where the electrode wire is made of the conventional binary PtRh alloy. In addition, in the platinum-rhodium alloy, the eutectic point between the second-phase precipitated grains and the matrix phase is lower than that of the PtRh alloy as the matrix phase. Therefore, welding or the like of the electrode wire is facilitated.

In the above temperature sensor, the platinum-rhodium alloy forming the electrode wire is composed of 0.1 to 1.5 mol % of Sr, 22 to 40 mol % of Rh, and a remainder composed of Pt and unavoidable impurities. The platinum-rhodium alloy may contain, in addition to the above components, unintended unavoidable impurities coming from raw materials or from a working process including a melting crucible.

When the platinum-rhodium alloy is cut and mirror-polished at the cut surface and then the mirror-polished surface is observed with observation means such as an optical microscope, an SEM, or the like, the above-mentioned area ratio (the area ratio of the second phase at the cross section) is an area ratio of visible second phase within a finite area included in the observation field.

In the platinum-rhodium alloy, when the Sr content is less than 0.1 mol %, precipitation of the second phase is insufficient, and excessive grain growth cannot be suppressed. On the other hand, when the Sr content exceeds 1.5 mol %, the second phase is excessively precipitated, leading to reduction in oxidation resistance and toughness. In addition, the platinum-rhodium alloy is likely to break during working.

In the platinum-rhodium alloy, when the Rh content is less than 22 mol %, the effect of improving the high-temperature strength may not be sufficiently achieved. On the other hand, when the Rh content exceeds 40 mol %, workability is degraded.

In the platinum-rhodium alloy, when the area ratio of the second phase at the cross section exceeds 25%, excessive precipitation of the second phase appears, leading to reduction in oxidation resistance and toughness. In addition, the platinum-rhodium alloy is likely to break during working.

In the above temperature sensor, the signal wire may be made of a material different from the material of the electrode wire. In this case, reduction in the material costs can be achieved by selecting, as a material of the signal wire, a material cheaper than the material of the electrode wire containing the expensive noble metal.

The signal wire may be made of an alloy containing, as a principal component, one selected from the group consisting of Fe, Ni, Co, and Cr. In this case, heat resistance of the signal wire can be improved. Thus, durability and reliability of the signal wire can be enhanced.

The electrode wire and the signal wire may be joined through welding. In this case, strength of the joint portion between the electrode wire and the signal wire can be increased. Thus, durability and reliability of the joint portion between the electrode wire and the signal wire can be enhanced. Examples of the welding include laser welding, resistance welding, and the like.

The electrode wire and the signal wire only need to be electrically connected to each other. The electrode wire and the signal wire may be directly connected (joined) to each other through welding as described above, or may be indirectly connected through another member.

The cross-sectional area of the electrode wire may be smaller than the cross-sectional area of the signal wire. In this case, the thickness, diameter, and the like of the electrode wire can be reduced, leading to reduction in the material costs of the electrode wire containing the expensive noble metal. In addition, even when the thickness, diameter, and the like of the electrode wire are reduced, sufficient high-temperature strength of the electrode wire can be ensured. The cross-sectional areas of the electrode wire and the signal wire are the areas of the cross sections thereof orthogonal to the axial direction.

The temperature sensor may be used at high temperatures, for example, 600° C. or more. Also in this case, sufficient high-temperature strength of the electrode wire can be ensured, and satisfactory durability and reliability of the electrode wire can be achieved.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Hereinafter, embodiments of the present invention will be described with reference to the drawings.

Embodiment 1

Figure 1:
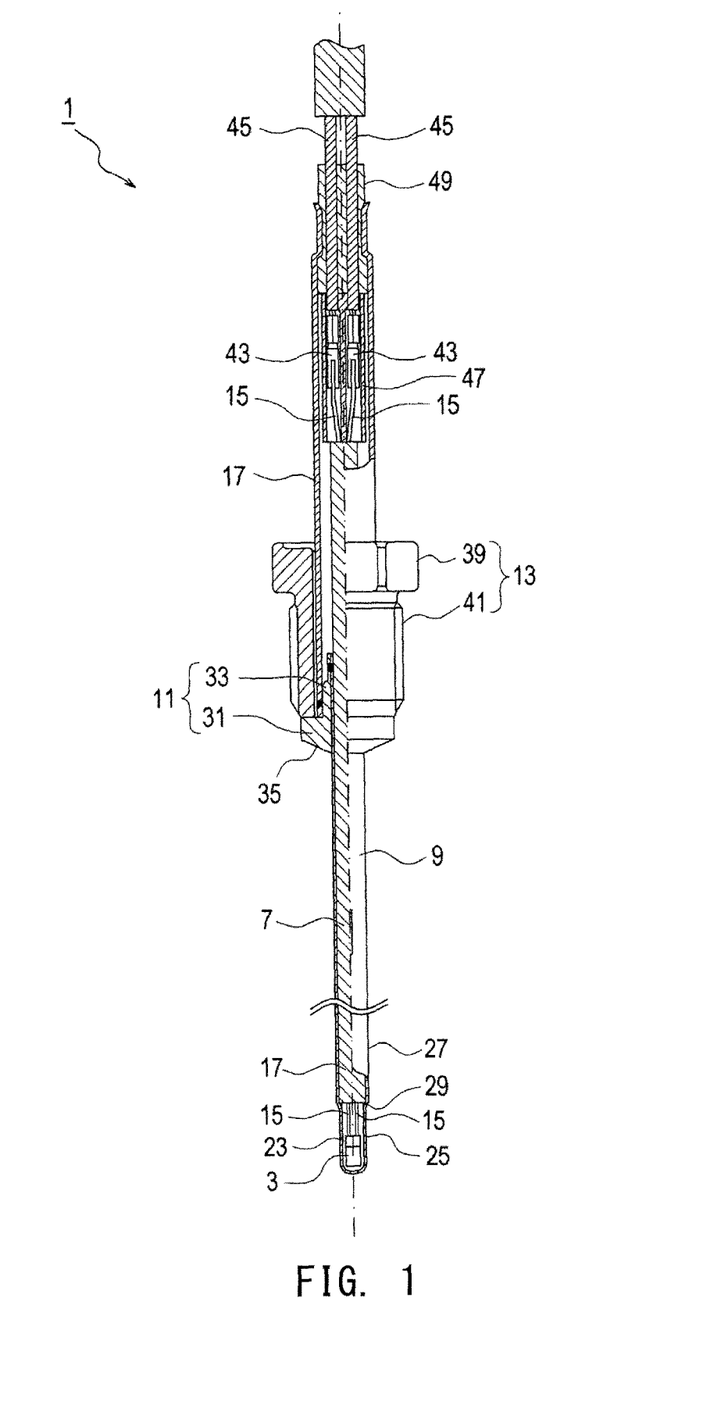
FIG. 1 is a partially cross-sectional explanatory view showing the overall structure of a temperature sensor according to Embodiment 1.
Figure 2:
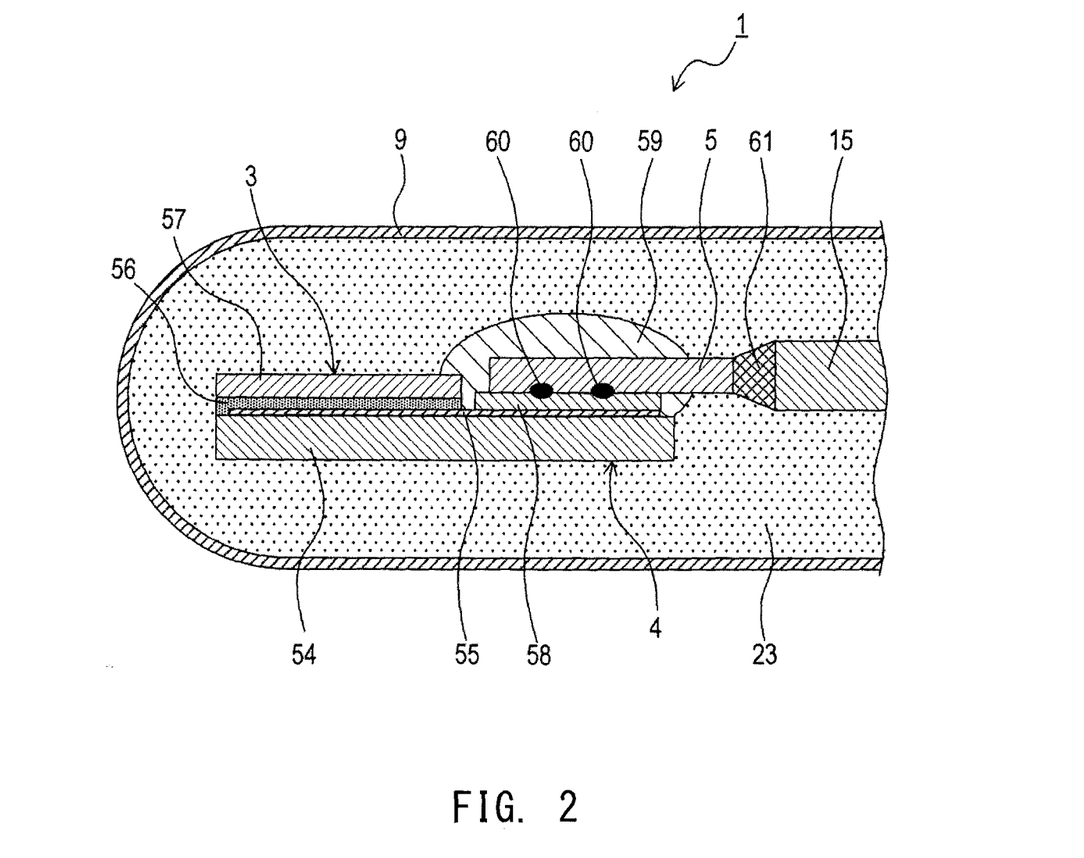
FIG. 2 is a cross-sectional explanatory view showing, in an enlarged manner, a front-side portion of the temperature sensor according to Embodiment 1.

As shown in FIGS. 1 and 2, a temperature sensor 1 includes: a temperature sensing element 3 including a temperature sensing portion 4, the electrical characteristics of which vary depending on temperature, and electrode wires 5 for outputting an electric signal from the temperature sensing portion 4 to the outside; and sheath core wires (signal wires) 15 electrically connected to the electrode wires 5.

The electrode wires 5 are formed from a platinum-rhodium alloy. The platinum-rhodium alloy is composed of 0.1 to 1.5 mol % of Sr, 22 to 40 mol % of Rh, and a remainder composed of Pt and unavoidable impurities. In the platinum-rhodium alloy, second-phase precipitated grains mainly composed of Sr and Pt are dispersed in a matrix phase, and the area ratio of the second phase at the cross section is not greater than 25%. Hereinafter, the temperature sensor 1 will be described in detail.

As shown in FIG. 1, the temperature sensor 1 is mounted to a flow pipe such as an exhaust pipe of an internal combustion engine so as to be disposed in the flow pipe in which measurement target gas (exhaust gas) flows, whereby the temperature sensor 1 is used for detecting the temperature of the measurement target gas. The longitudinal direction of the temperature sensor 1 is the axial direction, and corresponds to the up-down direction in FIG. 1. In addition, the front side of the temperature sensor 1 is the lower side in FIG. 1, and the rear side of the temperature sensor 1 is the upper side in FIG. 1.

The temperature sensor 1 includes the temperature sensing element 3, a sheath member 7, a metal tube 9, a mounting member 11, and a nut member 13. The temperature sensing element 3 is a temperature measurement element disposed in the flow tube in which the measurement target gas flows. The temperature sensing element 3 is disposed inside the metal tube 9. The temperature sensing element 3 will be described later in detail.

The sheath member 7 includes: a metal sheath 17; a pair of sheath core wires 15 formed from a conductive metal; and insulating powder (not shown) that electrically insulates the sheath 17 and the pair of sheath core wires 15 from each other and holds the sheath core wires 15. That is, the sheath member 7 is configured to insulatively hold the pair of sheath core wires 15 inward the sheath 17.

The metal tube 9 is a bottomed tubular member formed by closing a front end portion thereof in the axial direction by means of deep drawing of a steel plate. The axial dimension of the metal tube 9 is set such that a rear end portion thereof in the axial direction is in contact with the inner surface of the mounting member 11. The metal tube 9 is formed from a corrosion-resistant metal (e.g., a stainless alloy such as SUS310S which is also a heat-resistant metal).

The metal tube 9 includes: a small-diameter portion 25 formed at the front end thereof; a large-diameter portion 27 formed on the rear side relative to the small-diameter portion 25, and having an outer diameter larger than that of the small-diameter portion 25; and a step portion 29 formed between the small-diameter portion 25 and the large-diameter portion 27. The outer diameter of the step portion 29 gradually increases from the small-diameter portion 25 toward the large-diameter portion 27.

Inside the metal tube 9, the temperature sensing element 3 and cement (holding member) 23 are disposed. The cement 23 fills a space around the temperature sensing element 3, and holds the temperature sensing element 3 to suppress oscillation of the temperature sensing element 3. The cement 23 is formed from a highly heat-resistant and insulative material having high thermal conductivity.

As an example of the cement 23, cement which is mainly composed of an oxide such as $Al_2O_3$ or MgO, a nitride such as AlN, TiN, $Si_3N_4$ or BN, and a carbide such as SiC, TiC or ZrC, etc. may be used. Alternatively, as an example of the cement 23, cement which is mainly composed of an oxide such as $Al_2O_3$ or MgO, a nitride such as AlN, TiN, $Si_3N_4$ or BN, and a carbide such as SiC, TiC or ZrC, etc. and is mixed with an inorganic binder such as $Al_2O_3$, $SiO_2$ or MgO, may be used.

The mounting member 11 surrounds a rear-side outer circumferential surface of the metal tube 9 with the front end of the metal tube 9 being exposed to the outside, and supports the metal tube 9. The mounting member 11 includes a projecting portion 31 which projects outward in the radial direction, and a rear-side sheath portion 33 which is located on the rear side relative to the projecting portion 31 and extends in the axial direction.

A mounting seat surface 35 is provided at the front side of the projecting portion 31. The mounting seat surface 35 is formed in a tapered shape, the outer diameter of which decreases toward the front side. The mounting seat surface 35 corresponds to a sensor mounting position (not shown) of the exhaust pipe. The sensor mounting position of the exhaust pipe is, as a portion in contact with the mounting seat surface 35, formed so as to have a tapered portion, the outer diameter of which increases toward the rear side.

When the mounting member 11 is disposed at the sensor mounting position of the exhaust pipe, the mounting seat surface 35 comes into close contact with the tapered portion of the sensor mounting position, thereby to suppress leakage of exhaust gas from the exhaust pipe to the outside. After the mounting member 11 is pressed into the rear end portion of the metal tube 9, the rear-side sheath portion 33 of the mounting member 11 is welded to the metal tube 9 through laser welding, whereby the mounting member 11 and the metal tube 9 are fixed to each other.

The nut member 13 is a tubular member having a hexagonal nut portion 39 and a threaded portion 41. The nut member 13 is pivotably disposed at the outer circumference of the mounting member 11 with a front end surface of the threaded portion 41 being in contact with a rear end surface of the projecting portion 31. The threaded portion 41 of the nut member 13 is engaged with a thread groove formed in the exhaust pipe, whereby the temperature sensor 1 is mounted at the sensor mounting position of the exhaust pipe.

The sheath core wires 15 have front end portions electrically connected to the temperature sensing element 3. The sheath core wires 15 have rear end portions connected to crimping terminals 43 through resistance welding. That is, the rear end portions of the sheath core wires 15 are connected through the crimping terminals 43 to lead wires 45 for connection of an external circuit (e.g., an electronic control unit (ECU) of a vehicle).

The rear end portions of the pair of sheath core wires 15 are insulated from each other by an insulating tube 47, and the pair of crimping terminals 43 are also insulated from each other by the insulating tube 47. Each of the lead wires 45 is a conductive wire coated with an insulating coating material. The lead wires 45 are arranged so as to penetrate through the inside of a seal member 49 made of a heat-resistant rubber.

As shown in FIG. 2, the temperature sensing element 3 includes: the temperature sensing portion 4, the electrical characteristics of which vary depending on the temperature; and a pair of electrode wires 5 connected to the temperature sensing portion 4.

The temperature sensing portion 4 includes a ceramic base 54, a metal resistor 55, a bonding layer 56, a ceramic coating layer 57, and an electrode pad 58.

The ceramic base 54 is a sintered sheet formed from alumina having a purity of 99.5 to 99.9%, which is formed by sintering a ceramic green sheet in advance.

The metal resistor 55 is a temperature measuring resistor mainly composed of platinum (Pt), the electrical characteristics (electric resistance value) of which vary depending on the temperature. The metal resistor 55 is formed in a predetermined pattern on the surface of the ceramic base 54.

The ceramic coating layer 57 is a sintered sheet formed from alumina having a purity of 99.5 to 99.9%, which is formed by sintering a ceramic green sheet in advance. The ceramic coating layer 57 coats a front end portion of the metal resistor 55 at a surface of the metal resistor 55 opposite to the surface in contact with the ceramic base 54.

The bonding layer 56 is formed from alumina having a purity of 99.5 to 99.9%. The bonding layer 56 is, before bonding, a paste containing alumina powder. The ceramic base 54 and the ceramic coating layer 57, which have been sintered, are bonded to each other by using the paste, and then the paste is subjected to heat treatment to finally form the bonding layer 56.

To a portion of the metal resistor 55 on the rear side (the right side in FIG. 2), the pair of electrode wires 5 are electrically connected through an electrode pad 58 formed to be wider than the conductive pattern coated with the ceramic coating layer 57. The electrode pad 58 and the pair of electrode wires 5 are joined at a welding point 60 through welding such as resistance welding or laser welding.

The joint portion between the electrode pad 58 and the pair of electrode wires 5 is coated with a coating member 59. The coating member 59 is formed from a glass material containing aluminosilicate glass as a principal component. This glass material may contain a ceramic material (alumina or the like) as an accessory component.

The pair of electrode wires 5 are disposed so as to extend from the rear side of the metal resistor 55 toward the sheath member 7. The rear ends of the pair of electrode wires 5 are disposed so as to oppose the front ends of the pair of sheath core wires 15. The rear ends of the pair of electrode wires 5 and the front ends of the pair of sheath core wires 15 are joined through a welded portion 61 by welding such as resistance welding or laser welding. The cross-sectional area of each electrode wire 5 is set to be smaller than the cross-sectional area of each sheath core wire 15. The cross-sectional areas of the electrode wire 5 and the sheath core wire 15 are the areas of the cross sections thereof orthogonal to the axial direction.

In the present embodiment, the electrode wires 5 are formed from the platinum-rhodium alloy composed of 0.1 to 1.5 mol % of Sr, 22 to 40 mol % of Rh, and a remainder composed of Pt and unavoidable impurities. In the platinum-rhodium alloy, second-phase precipitated grains mainly composed of Sr and Pt are dispersed in the matrix phase, and the area ratio of the second phase at the cross section is not greater than 25%.

On the other hand, the sheath core wires 15 connected to the electrode wires 5 are formed from a material different from the material of the electrode wires 5. Specifically, the sheath core wires 15 are formed from an alloy containing, as a principal component, one of Fe, Ni, Co, and Cr. As an example of the Fe alloy, SUS310S or the like may be used. As an example of the Ni alloy, NCF600, NCF601 or the like may be used.

Next, the functional effects of the temperature sensor 1 according to the present embodiment will be described.

In the temperature sensor 1 according to the present embodiment, since the second-phase precipitated grains are present in the ternary platinum-rhodium alloy forming the electrode wires 5, movement of grain boundaries is restricted, and therefore coarsening of crystal grains can be suppressed even when the temperature sensor 1 is used at high temperatures over a long term. In addition, the strength is improved due to the function of precipitation strengthening, and breaking elongation is advantageously large because of the fine grain diameter. Thus, the high-temperature strength of the electrode wires 5 is improved, leading to improved durability and reliability. Further, even when the temperature sensor 1 is used at high temperatures over a long term, occurrence of deficiency such as breakage of the electrode wires 5 can be suppressed.

Further, in the ternary platinum-rhodium alloy forming the electrode wires 5, almost all of Sr, which is an alkali earth metal, is present in the form of second phase precipitated grains, and almost all of the matrix phase portion is the binary PtRh alloy. Therefore, the electrical conductivity, the thermal conductivity, and the like of the electrode wires 5 are equivalent to and are not degraded from those in the case where the electrode wires are formed from the conventional binary PtRh alloy. In addition, in the platinum-rhodium alloy, the eutectic point between the second-phase precipitated grains and the matrix phase is lower than that of the PtRh alloy as the matrix phase. Therefore, welding or the like of the electrode wires 5 is facilitated.

Further, in the temperature sensor according to the present embodiment, the sheath core wires (signal wires) 15 are formed from a material different from the material of the electrode wires 5. Therefore, reduction in the material costs can be achieved by selecting, as a material of the sheath core wires 15, a material cheaper than the material of the electrode wires 5 containing the expensive noble metal.

The sheath core wires (signal wires) 15 are formed from an alloy containing, as a principal component, one of Fe, Ni, Co, and Cr. In this case, the heat resistance of the sheath core wires 15 can be improved. Thus, the durability and reliability of the sheath core wires 15 can be enhanced.

Further, the electrode wires 5 and the sheath core wires (signal wires) 15 are joined through welding. Therefore, the strength of the joint portion between the electrode wires 5 and the sheath core wires 15 can be increased. Thus, the durability and reliability of the joint portion between the electrode wires 5 and the sheath core wires 15 can be enhanced.

The cross-sectional area of each electrode wire 5 is smaller than the cross-sectional area of each sheath core wire (signal wire) 15. Therefore, the thickness, diameter, and the like of the electrode wire 5 can be reduced, leading to reduction in the material costs of the electrode wire 5 containing the expensive noble metal. In addition, even when the thickness, diameter, and the like of the electrode wire 5 are reduced, sufficient high-temperature strength of the electrode wire 5 can be ensured.

As described above, according to the present embodiment, it is possible to provide the temperature sensor 1 capable of improving the high-temperature strength of the electrode wires 5, by using, for the electrode wires 5, the platinum-rhodium alloy in which the crystal grains are not coarsened even in long-term use at high temperatures.

Embodiment 2

Figure 3:
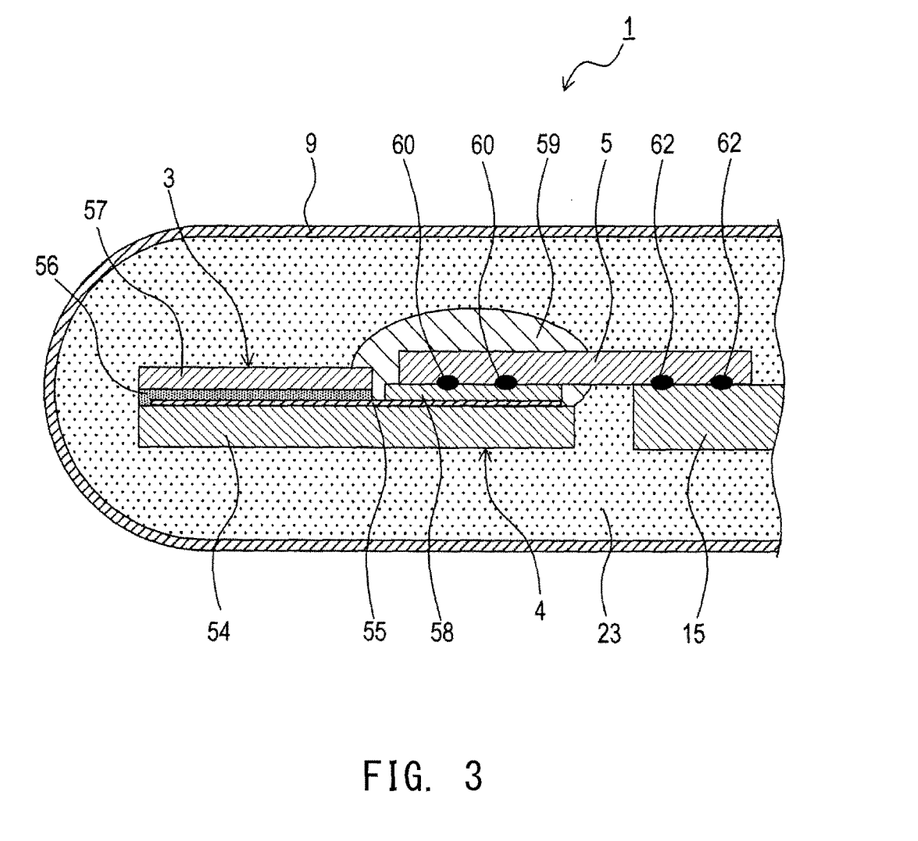
FIG. 3 is a cross-sectional explanatory view showing, in an enlarged manner, a front-side portion of a temperature sensor according to Embodiment 2.

In this embodiment, as shown in FIG. 3, the structure of the welded portion between the electrode wire 5 and the sheath core wire 15 in the temperature sensor 1 is modified. In Embodiment 2, the structure and functional effects identical to those of Embodiment 1 will not be described repeatedly.

As shown in FIG. 3, the rear end portions of the pair of electrode wires 5 are overlapped with the front end portions of the pair of sheath core wires 15 drawn from the front end of the sheath member 7 (refer to FIG. 1). The pair of electrode wires 5 and the pair of sheath core wires 15 are joined at welding points 62 through welding such as resistance welding or laser welding. The cross-sectional area of each electrode wire 5 is set to be smaller than the cross-sectional area of each sheath core wire 15.

(Test Evaluation)

Hereinafter, examples of the present invention will be described in comparison with comparative examples to verify the effects of the present invention.

First, platinum-rhodium alloys having chemical components as shown in Table 1 were prepared. Each platinum-rhodium alloy was formed by a conventionally known smelting method.

Regarding the platinum-rhodium alloys corresponding to alloy Nos. A1 to A4 used for Examples 1 to 4, each of the alloys was, by analysis using an EPMA and an XRD, identified to be an intermetallic compound in which the precipitated second phase was mainly composed of Sr and Pt, and it was confirmed that the second-phase precipitated grains were dispersed in the matrix phase. In addition, through cross-section observation with an optical microscope, SEM, or the like, it was confirmed that the area ratio of the second phase at the cross section was not greater than 25%.

A plurality of electrode wires made of the respective platinum-rhodium alloys were produced, and each electrode wire was welded to a sheath core wire. Then, a fatigue test to repeatedly load a stress was performed, followed by evaluation. The electrode wire and the sheath core wire were joined through welding in the state where the wires were partially overlapped with each other (refer to FIG. 3).

The fatigue test was performed under the following conditions: temperature environment: room temperature; tensile stress: 239 MPa; frequency: 10 Hz. Evaluation of the fatigue test was performed as follows. Presence/absence of breakage at the welded portion between the electrode wire and the sheath core wire was checked after the lapse of 5000 cycles, and a welded portion having no breakage was evaluated as "Passed" while a welded portion having breakage was evaluated as "Failed".

As shown in Table 1, in Comparative Example 5, the Rh content in the platinum-rhodium alloy forming the electrode wire is out of the range (22 to 40 mol %) of the present invention. In the Comparative Example 6, Sr is not contained in the platinum-rhodium alloy forming the electrode wire, and the Sr content is out of the range (0.1 to 1.5 mol %) of the present invention. Therefore, in the fatigue test, Comparative Examples 5 and 6 were evaluated as "Failed", and breakage occurred at the welded portion between the electrode wire and the sheath core wire.

On the other hand, in each of Examples 1 to 4, the chemical components in the platinum-rhodium alloy forming the electrode wire are within the range of the present invention. Therefore, in the fatigue test, Examples 1 to 4 were evaluated as "Passed", and no breakage occurred at the welded portion between the electrode wire and the sheath core wire.

TABLE 1

|  | Alloy No. | Chemical component (mol %) | | | Welding state | Fatigue test |
|---|---|---|---|---|---|---|
|  |  | Sr | Rh | Pt |  |  |
| Example | 1 A1 | 0.1 | 22.0 | Remainder | Overlapped | Passed |
|  | 2 A2 | 1.5 | 35.0 | Remainder | Overlapped | Passed |
|  | 3 A3 | 0.9 | 28.0 | Remainder | Overlapped | Passed |
|  | 4 A4 | 0.5 | 39.0 | Remainder | Overlapped | Passed |
| Comparative Example | 5 B1 | 1.5 | 5.4 | Remainder | Overlapped | Failed |
|  | 6 B2 | — | 22.0 | Remainder | Overlapped | Failed |

Next, a plurality of electrode wires made of platinum-rhodium alloys having chemical components shown in Table 2 were produced, and a plurality of temperature sensors using the respective electrode wires were produced. Each electrode wire was joined to a sheath core wire through welding in the state where the wires were opposed to each other (refer to FIG. 2) or partially overlapped with each other (refer to FIG. 3). Then, each temperature sensor was subjected to a cycle test in which increase and decrease in temperature were repeated between room temperature and a maximum temperature, followed by evaluation of robustness.

The cycle test was performed under the following conditions: maximum temperature: 800° C.; maximum temperature holding time: 60 seconds; temperature increase time: 30 seconds; temperature decrease time: 30 seconds. When the temperature was decreased to the room temperature, the temperature was not held at the room temperature but was immediately increased. Evaluation of robustness was performed as follows. Presence/absence of breakage of each electrode wire was checked after the lapse of 4000 cycles, and an electrode wire having no breakage was evaluated as "Passed" while an electrode wire having breakage was evaluated as "Failed".

As shown in Table 2, in Comparative Example 10, Sr is not contained in the platinum-rhodium alloy forming the electrode wire, and the Sr content is out of the range (0.1 to 1.5 mol %) of the present invention. Therefore, robustness of Comparative Example 10 was evaluated as "Failed", and breakage occurred in the electrode wire.

On the other hand, in each of Examples 7 to 9, the chemical components of the platinum-rhodium alloy forming the electrode wire are within the range of the present invention. Therefore, robustness of each of Examples 7 to 9 was evaluated as "Passed", and no breakage occurred in the electrode wire.

TABLE 2

|  | Alloy No. | Chemical component (mol %) | | | Welding state | Robustness |
|---|---|---|---|---|---|---|
|  |  | Sr | Rh | Pt |  |  |
| Example | 7 A1 | 0.1 | 22.0 | Remainder | Overlapped | Passed |
|  | 8 A1 | 0.1 | 22.0 | Remainder | Opposed | Passed |
|  | 9 A2 | 1.5 | 35.0 | Remainder | Overlapped | Passed |
| Comparative Example | 10 B2 | — | 22.0 | Remainder | Overlapped | Failed |

Other Embodiments

The present invention is not limited to the above embodiments or the like at all, and needless to say, can be carried out in various modes without deviating from the scope of the present invention.

(1) In the above embodiments, the Fe alloy and the Ni alloy are described as examples of the alloy forming the sheath core wire (signal wire) 15. However, the present invention is not restricted thereto. For example, a Co alloy, a Cr alloy, and the like may be used. Specifically, UMCo-50 (manufactured by Hitachi Metals MMC Superalloy, Ltd.) may be used as an example of the Co alloy, and Kurimax (manufactured by Kurimoto, Ltd.) may be used as an example of the Cr alloy.

(2) In the above embodiments, the temperature sensing portion 4 is formed by using the metal resistor 55, the electrical characteristics of which vary depending on the temperature. Alternatively, the temperature sensing portion 4 may be formed by using, for example, a thermistor sintered body, the electrical characteristics of which vary depending on the temperature. As an example of the thermistor sintered body, perovskite oxide containing $(Sr,Y)(Al,Mn,Fe)O_3$ as a base component may be used.

Figure 4:
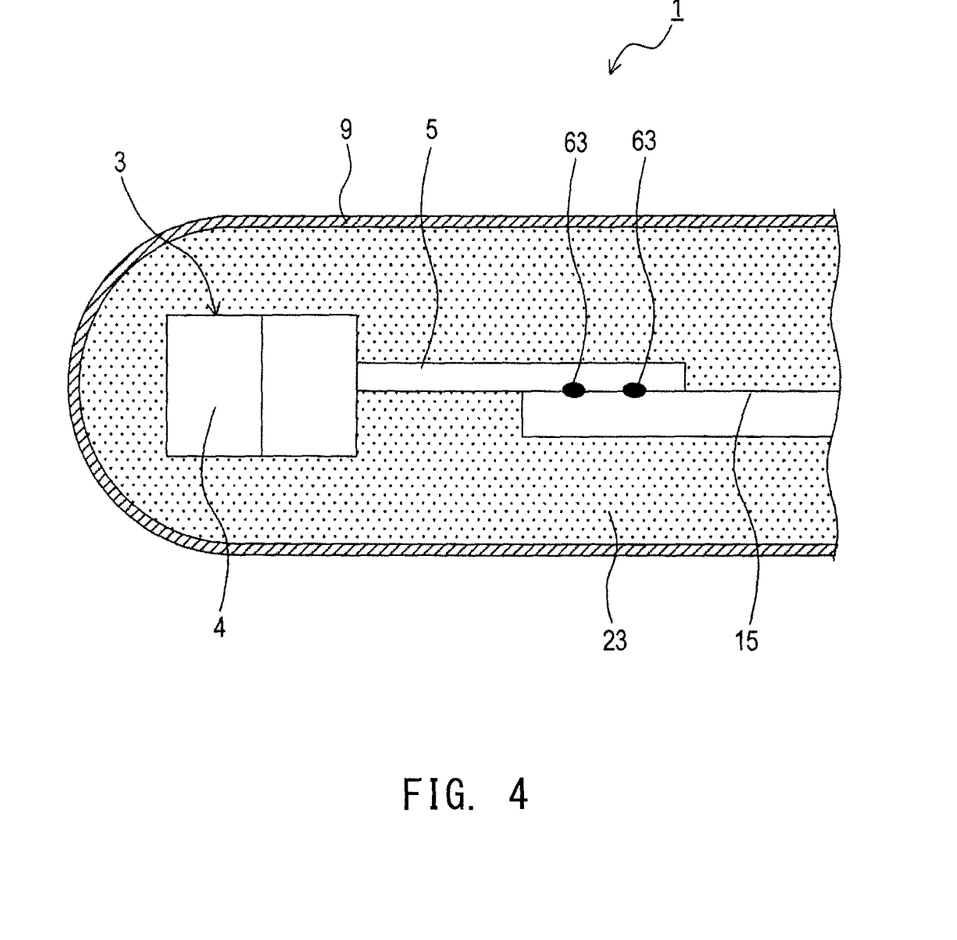
FIG. 4 is a cross-sectional explanatory view showing, in an enlarged manner, a front-side portion of a temperature sensor according to another embodiment.

FIG. 4 shows a temperature sensor 1 including a temperature sensing element 3 which includes a temperature sensing portion 4 formed from such a thermistor sintered body, and a pair of electrode wires 5 connected to the temperature sensing portion 4. Rear end portions of the pair of electrode wires 5 are overlapped with front end portions of a pair of sheath core wires 15 drawn from a front end of a sheath member 7 (refer to FIG. 1). The pair of electrode wires 5 and the pair of sheath core wires 15 are joined at welding points 63 through welding such as resistance welding or laser welding. The cross-sectional area of each electrode wire 5 is set to be smaller than the cross-sectional area of each sheath core wire 15. Also in the above structure, the same functional effects as those of above Embodiments 1 and 2 can be achieved by forming the electrode wires 5 from the above-mentioned ternary platinum-rhodium alloy.

DESCRIPTION OF REFERENCE NUMERALS

1 . . . temperature sensor
3 . . . temperature sensing element
4 . . . temperature sensing portion
5 . . . electrode wire
15 . . . sheath core wire (signal wire)

The invention claimed is:

1. A temperature sensor comprising:
a temperature sensing element including a temperature sensing portion with a metal resistor, electrical characteristics of which resistor vary depending on the temperature, and an electrode wire that outputs an electric signal from the temperature sensing portion to an outside; and
a signal wire electrically connected to the electrode wire, wherein
the electrode wire is made of a platinum-rhodium alloy,
the platinum-rhodium alloy comprises 0.1 to 1.5 mol % of Sr, 22 to 40 mol % of Rh, and a remainder composed of Pt and unavoidable impurities,
the platinum-rhodium alloy has a second-phase composed essentially of Sr and Pt whose precipitated grains are dispersed in a matrix phase, and
an area ratio of the second phase at a cross section is not greater than 25%.

2. The temperature sensor according to claim 1, wherein the signal wire is made of a material different from the material of the electrode wire.

3. The temperature sensor according to claim 2, wherein the signal wire is made of an alloy containing, as a principal component, an element selected from the group consisting of Fe, Ni, Co, and Cr.

4. The temperature sensor according to claim 1, wherein the electrode wire and the signal wire are welded to each other.

5. The temperature sensor according to claim 1, wherein a cross-sectional area of the electrode wire is smaller than a cross-sectional area of the signal wire.

6. The temperature sensor according to claim 2, wherein the electrode wire and the signal wire are welded to each other.

7. The temperature sensor according to claim 3, wherein the electrode wire and the signal wire are welded to each other.

8. The temperature sensor according to claim 2, wherein a cross-sectional area of the electrode wire is smaller than a cross-sectional area of the signal wire.

9. The temperature sensor according to claim 3, wherein a cross-sectional area of the electrode wire is smaller than a cross-sectional area of the signal wire.

10. The temperature sensor according to claim 4, wherein a cross-sectional area of the electrode wire is smaller than a cross-sectional area of the signal wire.

11. The temperature sensor according to claim 1, wherein in the platinum-rhodium alloy, Sr is present in a form of the second phrase precipitated grains.

12. The temperature sensor according to claim 1, wherein the matrix phase is a binary platinum-rhodium alloy.

13. The temperature sensor according to claim 11, wherein a eutectic point between the second-phase precipitated grains and the matrix phase is lower than an eutectic point of the binary platinum-rhodium alloy of the matrix phase.

14. The temperature sensor according to claim 1, wherein the second-phase precipitated grains are present in a ternary platinum-rhodium alloy.

15. The temperature sensor according to claim 1, wherein the second-phase precipitated grains restrict movement of grain boundaries in such a way that coarsening of crystal grains of the platinum-rhodium alloy can be suppressed.

* * * * *